United States Patent
Rose et al.

(10) Patent No.: US 8,625,624 B1
(45) Date of Patent: Jan. 7, 2014

(54) SELF-ADJUSTING LOAD BALANCING AMONG MULTIPLE FABRIC PORTS

(75) Inventors: Kenneth M. Rose, Palo Alto, CA (US); David S. Walker, San Jose, CA (US); Vijay A. Nebhrajani, Sunnyvale, CA (US); Matthew Todd Lawson, Grass Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 820 days.

(21) Appl. No.: 12/138,569

(22) Filed: Jun. 13, 2008

(51) Int. Cl.
 *H04L 12/56* (2011.01)
(52) U.S. Cl.
 CPC .............. *H04L 47/6205* (2013.01); *H04L 49/90* (2013.01)
 USPC ........................................... 370/414; 370/429
(58) Field of Classification Search
 None
 See application file for complete search history.

(56) References Cited

U.S. PATENT DOCUMENTS

| | | | | |
|---|---|---|---|---|
| 5,493,566 | A * | 2/1996 | Ljungberg et al. | 370/231 |
| 5,838,922 | A * | 11/1998 | Galand et al. | 370/412 |
| 5,892,766 | A * | 4/1999 | Wicki et al. | 370/412 |
| 5,987,028 | A * | 11/1999 | Yang et al. | 370/380 |
| 6,961,342 | B1 * | 11/2005 | Uzun et al. | 370/414 |
| 6,973,032 | B1 * | 12/2005 | Casley et al. | 370/230 |
| 7,027,457 | B1 * | 4/2006 | Chiussi et al. | 370/414 |
| 7,103,039 | B1 * | 9/2006 | Rose | 370/386 |
| 7,120,117 | B1 * | 10/2006 | Liu et al. | 370/236 |
| 7,184,403 | B1 * | 2/2007 | Morishige et al. | 370/235 |
| 7,230,917 | B1 * | 6/2007 | Fedorkow et al. | 370/229 |
| 7,263,066 | B1 * | 8/2007 | Yun et al. | 370/236 |
| 7,277,429 | B2 * | 10/2007 | Norman et al. | 370/389 |
| 7,324,541 | B2 * | 1/2008 | Muthukrishnan et al. | 370/429 |
| 7,450,602 | B2 * | 11/2008 | Vazquez Castro | 370/412 |
| 7,613,200 | B1 * | 11/2009 | Williams et al. | 370/414 |
| 7,623,456 | B1 * | 11/2009 | Chen et al. | 370/235 |
| 7,724,760 | B2 * | 5/2010 | Balakrishnan et al. | 370/416 |
| 7,903,659 | B2 * | 3/2011 | Sindhu et al. | 370/392 |
| 7,911,960 | B1 * | 3/2011 | Aydemir et al. | 370/412 |
| 2001/0036157 | A1 * | 11/2001 | Blanc et al. | 370/235 |
| 2002/0006110 | A1 * | 1/2002 | Brezzo et al. | 370/229 |
| 2002/0064172 | A1 * | 5/2002 | Siu et al. | 370/429 |
| 2004/0013124 | A1 * | 1/2004 | Peebles et al. | 370/412 |
| 2004/0100980 | A1 * | 5/2004 | Jacobs et al. | 370/412 |
| 2004/0110442 | A1 * | 6/2004 | Rhim et al. | 442/361 |
| 2007/0076736 | A1 * | 4/2007 | Sharma et al. | 370/415 |
| 2008/0175259 | A1 * | 7/2008 | Chao et al. | 370/413 |
| 2008/0184259 | A1 * | 7/2008 | Lesartre et al. | 719/312 |
| 2010/0220595 | A1 * | 9/2010 | Petersen | 370/235 |

* cited by examiner

*Primary Examiner* — Timothy J Weidner
(74) *Attorney, Agent, or Firm* — Campbell Stephenson LLP (57) ABSTRACT

A self-adjusting load balancing among multiple fabric ports. A plurality of first values is received in response to receiving a first frame, wherein each of the first values is related to a quantity of data stored in a respective one of a plurality of buffers of fabric ports. First identifiers are also received, each of which corresponds to a respective one of a first subset of the plurality of buffers. A subset of the first identifiers is selected based on one or more of the first values. Thereafter one of the first identifiers contained in the selected subset is selected. Ultimately the first frame is transmitted to the buffer that corresponds to the selected one of the first identifiers.

13 Claims, 7 Drawing Sheets

SELF-ADJUSTING LOAD BALANCING AMONG MULTIPLE FABRIC PORTS

BACKGROUND OF THE INVENTION

Switching devices are typically data link layer devices that enable multiple network devices to communicate with each other or enable physical network (e.g., local area network (LAN) or wide area network (WAN)) segments to be interconnected into a single larger network. In the most general sense, switching devices transport data in the form of frames between input/output (I/O) ports. A frame is a logical grouping of information sent as a data link layer unit over a transmission medium. Each frame typically includes data payload sandwiched between header and trailer information. The terms cell, datagram, message, packet and segment are also used to describe logical information groupings at various layers of the OSI reference model and in various technology circles. As used herein, the term "frame" should be understood in its broadest sense, and can be defined to encompass other terms such as cell, datagram, message, packet, segment, etc.

Switching devices often employ switching fabrics that have multiple I/O ports coupled to each other. Each I/O port typically contains an input buffer that receives and stores frames until they can be transmitted to output buffers of other I/O ports. Frames transmitted to an output buffer are received and stored in that buffer until they can be subsequently transferred towards their ultimate network device destination. Users typically require that each switching device operate as quickly as possible in order to maintain a high data throughput rate. Unfortunately, output buffers may become congested with frames at times, which may lead to latency and blocking issues.

BRIEF DESCRIPTION OF THE DRAWINGS

The example embodiments may be better understood, and its numerous objects, features and advantages made apparent to those skilled in the art by referencing the accompanying drawings.

The use of the same reference symbols in different drawings indicates similar or identical items.

DETAILED DESCRIPTION OF EXAMPLE EMBODIMENTS

OVERVIEW A method and apparatus is described below for balancing loads among multiple fabric ports. In one embodiment, the method includes receiving a plurality of first values in response to receiving a first frame, wherein each of the first values is related to a quantity of data stored in a respective one of a plurality of buffers of fabric ports. First identifiers are also received, each of which corresponds to a respective one of a first subset of the plurality of buffers. A subset of the first identifiers is selected based on one or more of the first values. Thereafter one of the first identifiers contained in the selected subset is selected. Ultimately the first frame is transmitted to the buffer that corresponds to the selected one of the first identifiers.

Figure 1:
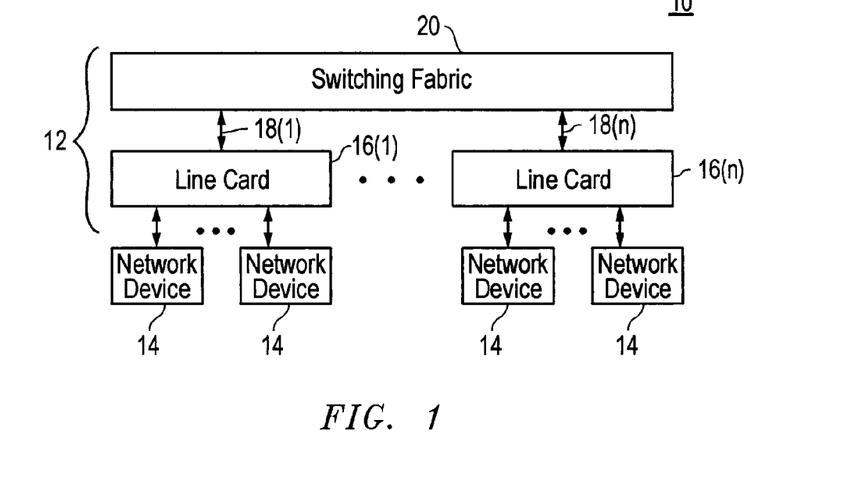
FIG. 1 is a simplified block diagram of a network.

FIG. 1 illustrates in block diagram form, relevant components of an example network 10 that employs a switching device 12. In this example, switching device 12 enables data communication between network devices 14, which can, in general, include a variety of different devices including computer systems, output devices, storage devices, communication devices, or other network components such as routers, other switching devices, and even other networks. Switching devices, such as switching device 12, make forwarding decisions for frames they receive based on forwarding information such as Media Access Control (MAC) addresses, Internet Protocol (IP) addresses, etc., that are contained within the received frames. Network 10 can employ one or more of a variety of different communication protocols enabling data communication between network devices 14.

Switching device 12 includes line cards 16 coupled to a switching fabric 20. Each line card 16 generally takes the form of an I/O interface card that performs frame analysis as part of the switching process. Switching fabric 20 can be implemented in a variety of ways. Three common types of switching fabrics include crossbars, single-bus architectures, and shared memory architectures. Crossbars use a mesh within the switching fabric to connect each I/O port input buffer (hereinafter input buffers) of the switching fabric to multiple I/O output port buffers (hereinafter output buffers). Crossbars can be highly efficient for "balanced traffic," e.g., if input buffer 1 is communicating with output buffer 2 by sending frames thereto, and if input buffer 3 is communicating with output buffer 4 by sending frames thereto, then the crossbar directs the transmission of frames between the input output pairs on two different paths. One of the key benefits of crossbars is the ability to scale significantly high bandwidth and throughputs. Consequently, crossbars are a popular.

Figure 2:
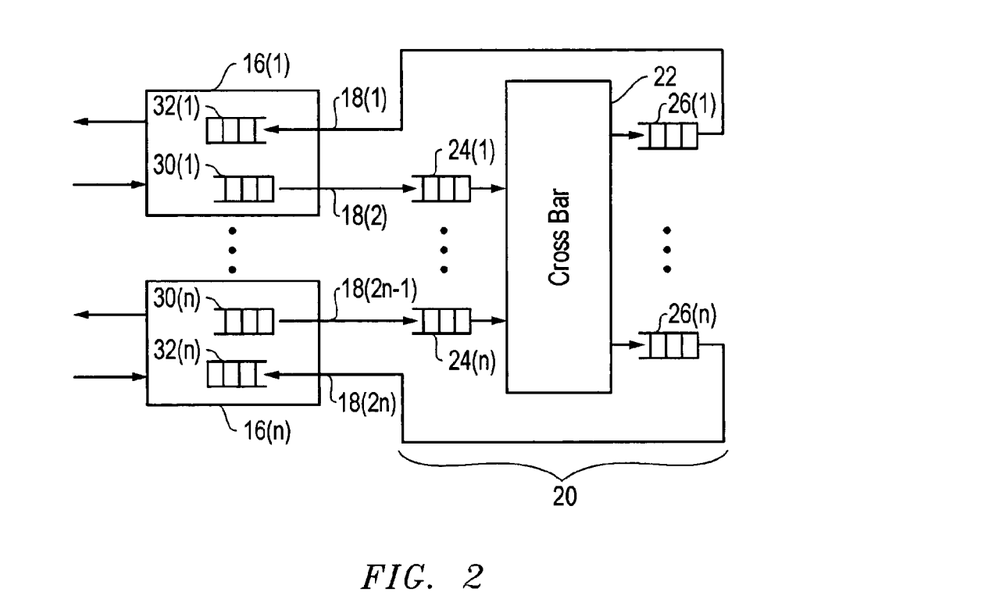
FIG. 2 is a block diagram illustrating relevant components of a switching device employed in FIG. 1.

FIG. 2 shows relevant components of the switching fabric 20 and two line cards 16 from FIG. 1. In support of crossbar 22, switching fabric 20 includes input buffers 24 and output buffers 26, each of which can be implemented as a first in first out (FIFO) storage device using a variety of memory structures as is well known in the art. FIG. 2 shows input buffers that are separated from the group of output buffers. In typical implementations, there is an input and output buffer pairing for each I/O port of the switching fabric. Consequently, input and output buffer pairs are associated with each line card 16. In the illustrated example, input buffer 24(1) and output buffer 26(1) are paired together and in data communication with line card 16(1). Similarly, input buffer 24(n) and output buffer 26(n) are paired together and in data communication with line card 16(n). Each line card 16 shown in FIG. 2 includes an input queue 30 coupled to a respective input buffer 24 and an output queue 32 coupled to a respective output buffer 26.

To illustrate relevant aspects of basic operation, suppose line card 16(1) receives a frame from a network device (not shown in FIG. 2) coupled thereto, and the received frame is destined for another network device that is coupled to line card 16(n). Before a line card forwards a frame it receives, the line card, such as line card 16(1), calculates a fabric port of exit (FPOE) based on forwarding information (e.g., a destination MAC address, a destination IP address, etc.) contained in the frame. Each FPOE designates an exit I/O port of switching fabric, such as switching fabric 20, and by extension the output buffer of the exit I/O port. Switching fabric 20 uses the FPOEs to route frames it receives to the appropriate output buffer. In the illustrated example, the FPOE calculated for frames destined for network devices coupled to line card 16(n), should identify output buffer 26(n). One of ordinary skill in the art will understand that the FPOE calculated for a frame that is destined for a first network device coupled to a first line card 16 will be different when compared to the FPOE that is calculated for a frame destined for a second network device coupled to a second line card 16 since forwarding information within the two frames should be different.

After line card 16(1) calculates the FPOE for the frame it receives, the line card inserts the FPOE into a fabric header, which is attached to the frame. The frame with attached fabric header is stored in input queue 30(1) until it can be serialized and transmitted across a serial channel 18(2) where it is received by input buffer 24(1) of switching fabric 20. Using the FPOE contained within the fabric header, the frame is transmitted across crossbar 22 to the output buffer 26(n) that corresponds to the FPOE. Eventually the frame received by output buffer 26(n) is serialized and transmitted across a serial channel 18(2n) to the output queue 32 of line card 16(n).

Since each output buffer 26 can receive data frames from multiple input buffers 24, congestion problems can occur. For example, several line cards may attempt to send frames to line card 16(n), which can lead to increased latency or blocking. With latency, a frame from one input buffer 24 that is destined for an output buffer 26 (e.g., output buffer 26(n)), may have to wait for other frames to arrive at that output buffer via crossbar 22. In blocking, several input buffers 24 sending frames to the same output buffer 26 (e.g., output buffer 26(n)), may quickly fill the output buffer to the point the output buffer must inform the input buffers to stop sending any more frames, thus blocking frames at input buffers from reaching the output buffer.

Figure 3:
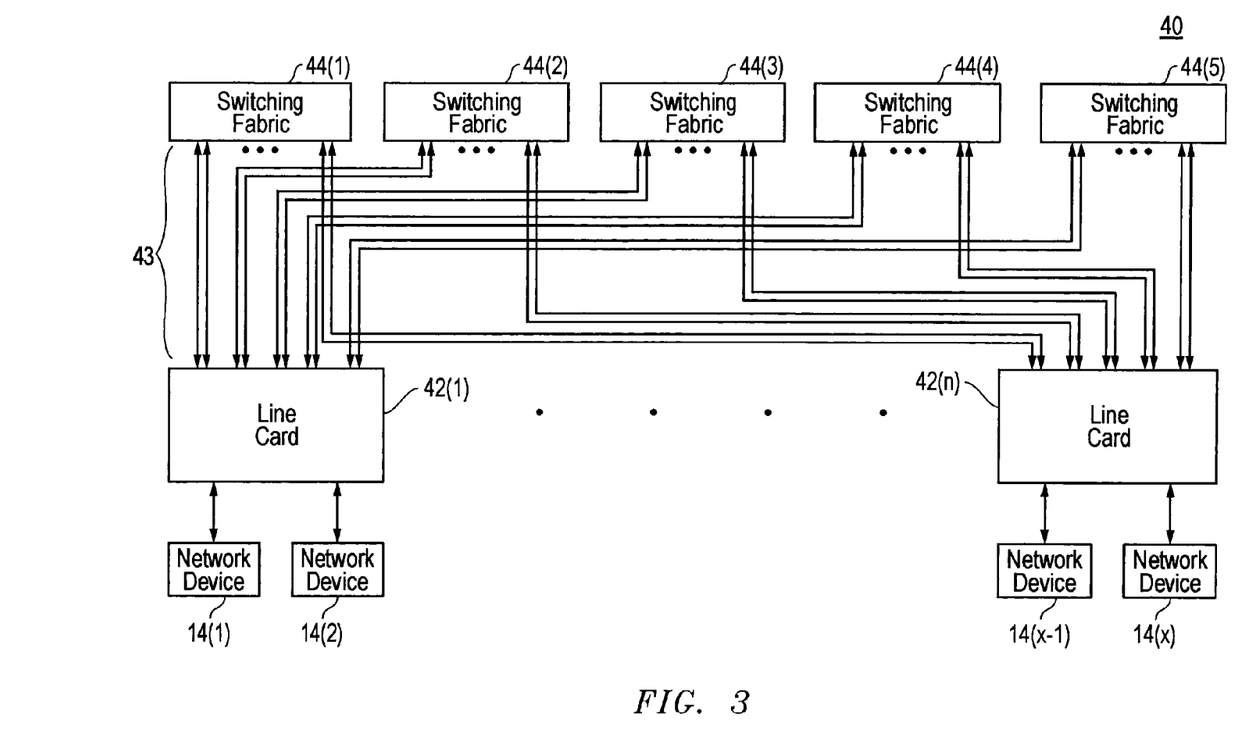
FIG. 3 is a simplified block diagram of another network.

To reduce latency and blocking, system designers can design switching devices with multiple data transmission channels between line cards and the switching fabric. To further reduce latency and blocking, system designers can design switching devices with multiple transmission channels from line cards to multiple switching fabrics. FIG. 3 illustrates in block diagram form, relevant components of a switching device 40 that includes several line cards 42, each of which is coupled to five switching fabrics 44 via respective pairs of transmission channels 43. Although not shown, each transmission channel 43 between a line card 42 and a switching fabric 44 includes a pair of unidirectional, serial transmission channels, much like the serial transmission channels 18 shown in FIG. 2. Importantly, frames received at one of the line cards 42, such as line card 42(1), may be forwarded to a destination network device 14 coupled to another line card 42, such as line card 42(n), using any one of the ten transmission channels 43 that are coupled between the line card 42(1) and switching fabrics 44.

For purposes of explanation only, each switching fabric 44 is presumed to be similar in structure and function to the switching fabric 20 of FIG. 2. There may be, however, at least one difference; whereas line cards 16 calculate FPOEs for frames they receive, switching fabrics 44 may also contain one or more devices that calculate FPOEs for frames they receive from line cards 42 based on forwarding information contained in the frames or based on information attached to the frames such as an FPOE database index, which will be more fully described below.

Figure 4:
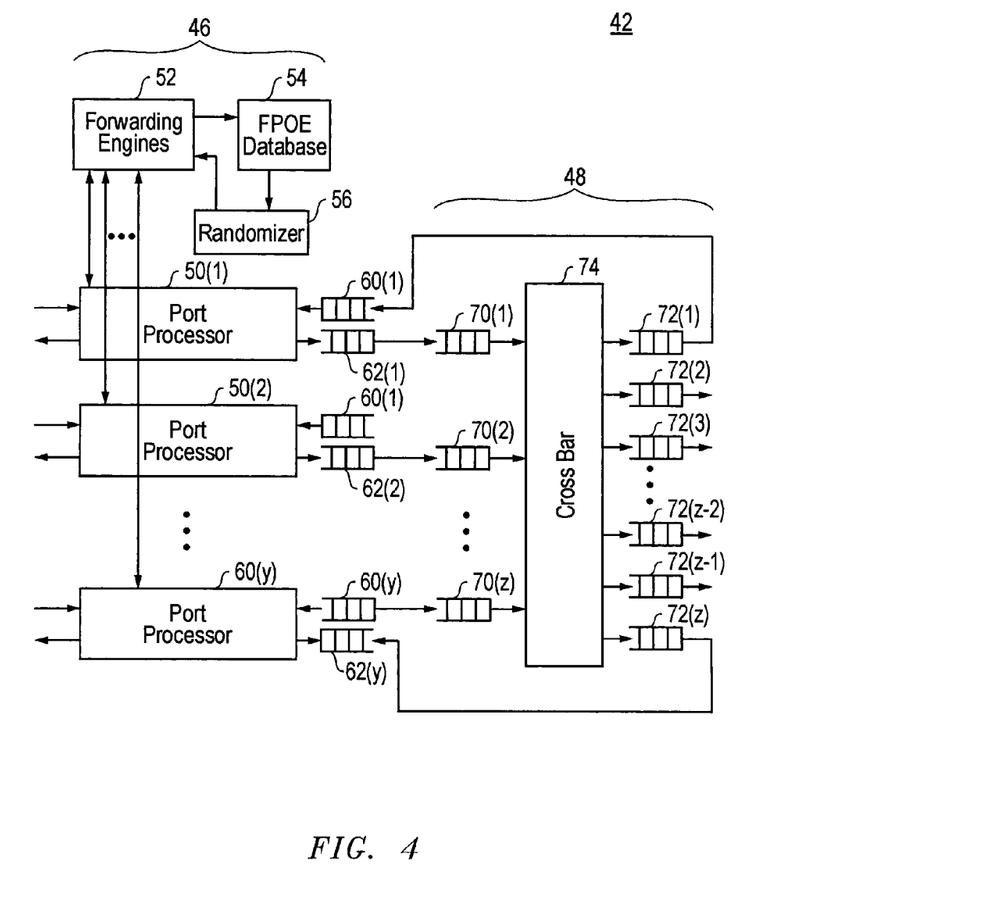
FIG. 4 is a block diagram illustrating relevant components of a switching device that can be employed in FIG. 3.

To facilitate use of multiple transmission channels to multiple switching fabrics 44, each line card 42 may include a switching fabric. FIG. 4 illustrates in block diagram form, relevant components of an example line card 42 employed in the switching device of FIG. 3. The line card 42 shown in FIG. 4 includes one interface circuit 46 coupled to a switching fabric 48. In an alternative embodiment, two or more interface circuits 46 may be coupled to switching fabric 48. Interface circuit 46 includes port processors 50, each of which is coupled to multiple network devices (not shown). Port processors 50 receive frames from network devices that are destined for another network device coupled to interface circuit 46 or to another line card 42. Each port processor 50 is also configured to forward frames they receive from switching fabric 48.

The interface circuit 46 includes a forwarding engine 52 coupled to each of the port processors 50 and to an FPOE database 54. The forwarding engine 52 may take form in a processor (not shown) that executes instructions that are stored in memory (not shown). Forwarding engine 52 may provide many services, one of which is to attach a fabric header to frames that are received by port processors from network devices. Another function of forwarding engine 52 is to calculate indexes to entries in FPOE database 54. As will be more fully described below, each entry in database 54 contains one or more FPOEs, and these FPOEs can be used by switching fabric 48 to route frames to an appropriate output buffers contained therein.

To illustrate operation, presume port processor 50(2) receives a frame F1 from a network device coupled thereto. In response, forwarding engine 52 attaches a fabric header FH1 to the received frame F. Forwarding engine 52 also calculates an FPOE database entry index (hereinafter FPOE index) I1 based upon forwarding information (e.g., one or more MAC addresses, one or more IP addresses, etc.) contained in the received frame F1. Forwarding engine 52 provides the FPOE index I1 it calculates to FPOE database 54. In one embodiment, FPOE database 54 may take form in a data structure that is stored in a memory (not shown) coupled to forwarding engine 52 and randomizer circuit 56. FPOE database 54 contains multiple entries, each of which maps a specific FPOE index to one or more candidate FPOEs. Each FPOE stored within FPOE database 54 corresponds to a respective output buffer of switching fabric 48. Entries in database 54 may contain common FPOEs. Indeed, some entries in database 54 may contain identical FPOEs. Some entries in database 54 may contain no common FPOEs. As an aside, FPOEs in one or more entries of database 54, may change over time.

Database 54 outputs a set of one or more FPOEs to randomizer circuit 56 that are mapped to an FPOE index that database 54 receives from forwarding engine 52. Continuing with the illustrated example, presume randomizer 56 receives a set S1 of candidate FPOEs from database 54 that are mapped to FPOE index I1. Each FPOE of S1 corresponds to a respective output buffer of switching fabric 48, which in turn is coupled to a respective communication channel 43 (see FIG. 3). Randomizer 56, as its name implies, randomly selects one FPOE from the set that randomizer 56 receives from database 54. This randomly selected FPOE is returned to forwarding circuit 52. In the illustrated example, randomizer 56 randomly selects one FPOE from the set S1, and randomizer 56 returns the randomly selected FPOE to forwarding engine 52, which in turn stores the randomly selected FPOE in the fabric header FH1 that it attached to the received frame F1. As an aside, forwarding engine 52 may also store the FPOE index I1 it calculated in the fabric header FH1.

After randomly selected FPOEs are added to fabric headers, frames along with their attached fabric headers are stored in input queues 62 until they can be transmitted to switching fabric 48, which includes input buffers 70 coupled to output buffers 72 via crossbar 74. Each input queue 62 is coupled to a respective input buffer 70 of switching fabric 48. Similarly, each output queue 60 is coupled to a respective output buffer 72 of switching fabric 48. Although not shown within FIG. 4, several of the output buffers 72 are coupled to respective input buffers of switching fabrics 44 via respective communication paths 43 (See FIG. 3).

The FPOEs stored in database 54 identify respective output buffers 72 of switching fabric 48, and switching fabric 48 uses the FPOEs to route frames it receives to the appropriate output buffer 72. In the illustrated example, the FPOE for frames destined for network devices coupled to port processor 50(1), will identify output buffer 72(1). In contrast the FPOE for frames destined for a network device that is coupled to another line card 42, will identify an output buffer that is coupled to an input buffer of one of the switching fabrics 44.

With continuing reference to FIGS. 3 and 4, since line card 42 can send a frame to another line card 42 via any of the output buffers 72 that are respectively coupled to ten transmission channels 43, congestion issues at output buffers 72 are reduced when compared to output buffers 26 in FIG. 2. Notwithstanding the randomness in which FPOEs are selected and frames are transmitted to output buffers 72, output buffers 72 may nonetheless experience congestion. Accordingly, it is desirable to have a switching scheme that reduces the likelihood of congestion of output buffers and accomplishes this goal with minimal impact on data transmission bandwidth and complexity.

Figure 5:
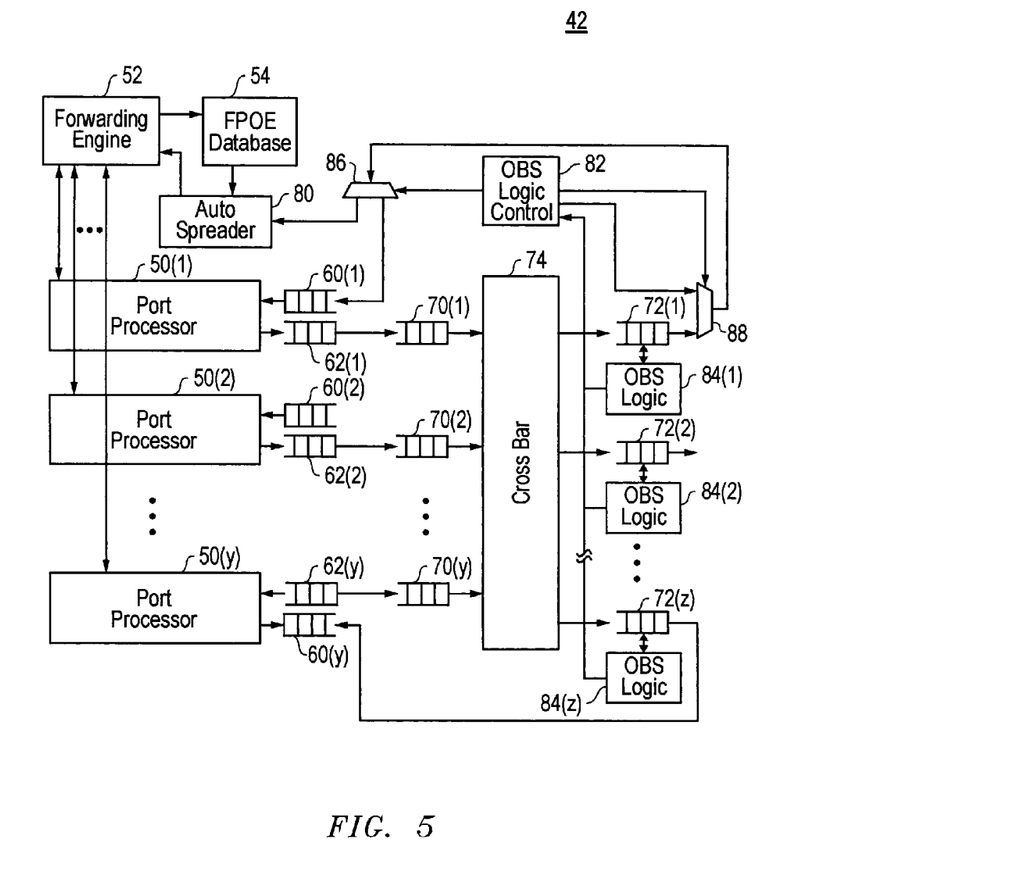
FIG. 5 is a block diagram illustrating relevant components of another switching device that can be employed in FIG. 1.

FIG. 5 illustrates the line card 42 of FIG. 4 with modifications that can further reduce the likelihood of congestion of output buffers. Specifically, randomizer 56 is replaced by an auto spreader circuit 80. Additionally, switching fabric 48 includes an output buffer status (OBS) logic control circuit 82 coupled to OBS logic circuits 84, switch 86, and multiplexer 88. Each of the OBS logic circuits 84 is coupled to a respective output buffer 72 and is configured to measure pending data stored therein. OBS logic control circuit 82 controls OBS logic circuits 84 in addition to controlling switch 86 and multiplexer 88 as will be more fully described below. The outputs of switch 86 are respectively coupled to auto spreader 80 and output queue 60(1). The inputs of multiplexer 88 are coupled to output buffer 72(1) and OBS logic control circuit 82. Lastly, the output of multiplexer 88 is coupled to one input of switch 86.

As noted above, each OBS logic circuit 84 is coupled to a respective output buffer 72. At regular time intervals the OBS logic circuits 84 calculate OBS values, respectively, based on the quantity of data pending in output buffers 72, respectively. In one embodiment the OBS values represent the quantity of data pending in output buffers 72, respectively. As an output buffer 72 fills with frames to be sent to a switching fabric 44 or to an output queue 62, the OBS value for the output buffer will increase correspondingly. In one embodiment, OBS values can be expressed as a "fullness factor" or a percentage of the total memory capacity in use in the respective output buffers. As an aside, if the OBS value is 100% for an output buffer, that buffer should not receive additional frames until one or more of the frames currently pending in the output buffer are subsequently transmitted out.

At regular time intervals, OBS logic control circuit 82 polls each OBS logic circuit 84 for the most recently calculated OBS value therein. Normally, output buffer 72(1) is coupled to output queue 60(1) via multiplexer 88 and switch 86 to enable normal frame transmission flow from output buffer 72(1) to output queue 60(1). However, OBS logic control 82 can toggle multiplexer 88 and switch 86 so that OBS logic control 82 can transmit to auto spreader 80 the most recently calculated OBS values it receives during polling. Thus, at regularly scheduled intervals, auto spreader 80 receives and stores OBS values representing the quantity of data, expressed as a percentage of total storage capacity, in output buffers 72. The OBS values are provided to auto spreader 80 so that the latest OBS values are real time or near real time values that represent the quantity of data in the output buffers 72. In an alternative embodiment, OBS values are continuously provided to auto spreader 80. Auto spreader 80 uses the OBS values in a process for selecting an FPOE from one or more FPOEs that are mapped to an FPOE index, as will be more fully described below.

Figure 6:
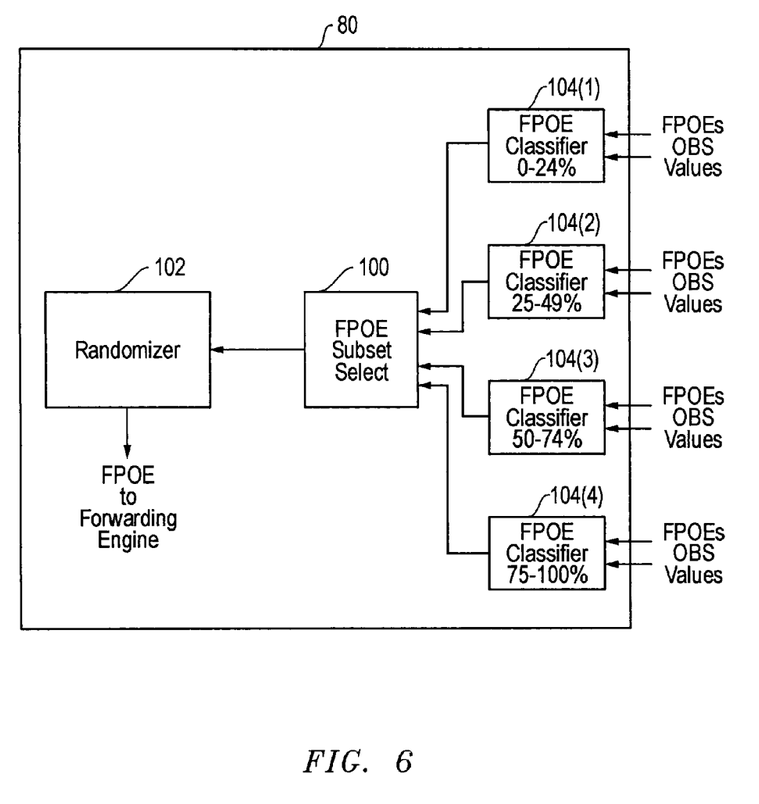
FIG. 6 is a block diagram illustrating relevant components of an auto spreader that can be employed in the switching device of FIG. 5.

FIG. 6 illustrates in block diagram form, relevant components of auto spreader 80. In one embodiment, auto spreader 80 may take form in software instructions executing on a processor. Alternatively, auto spreader 80 may also take form in hardware or a combination of hardware and software. As shown, auto spreader 80 includes an FPOE subset selector circuit 100 coupled between a randomizer circuit 102 and FPOE classifier circuits 104. During an operation to provide forwarding engine 52 with an FPOE for a frame, each of the FPOE classifier circuits 104 receives the same set of one or more FPOEs from FPOE database 54 (see FIG. 5). The set of FPOEs are provided to classifier circuits 104 in much the same way that randomizer 56 receives a set of FPOEs; database 54 outputs the set of FPOEs in response to database 54 receiving an FPOE index from forwarding engine 52. In addition to receiving the set of FPOEs, the FPOE classifier circuits 104 receive and store OBS values from OBS logic control circuit 82. In one embodiment, each FPOE classifier circuit 104 receives the same OBS values that represent the quantity of data in respective output buffers 72 at a given point in time. The OBS values are stored in memories (not shown) of classifier circuits 104 until overwritten by new OBS values from OBS logic circuit 82.

Each FPOE corresponds to a respective output buffer 72, and each OBS value corresponds to a respective output buffer 72. It follows that each FPOE corresponds to a respective OBS value. In operation, each FPOE classifier circuit 104 identifies the FPOEs it receives that are contained in predetermined class or category, and the identification is based on the OBS values. In the embodiments shown in FIG. 6, FPOE classifier circuit 104(1) identifies all FPOEs it receives that correspond to OBS values of 0-24%. Classifier circuit 104(1) then presents the FPOEs it identifies, if any, to FPOE set select circuit 100 as a first subset of FPOEs. FPOE classifier circuit 104(2) identifies all FPOEs it receives that correspond to OBS values of 25-49%. Classifier circuit 104(2) then presents the FPOEs it identifies, if any, to FPOE set select circuit 100 as a second subset of FPOEs. FPOE classifier circuit 104(3) identifies all FPOEs it receives that correspond to OBS values of 50-74%. Classifier circuit 104(3) then presents the FPOEs it identifies, if any, to FPOE set select circuit 100 as a third subset of FPOEs. FPOE classifier circuit 104(4) identifies all FPOEs it receives that correspond to respective OBS values of 75-100%. Classifier circuit 104(4) then presents the FPOEs it identifies, if any, to FPOE set select circuit 100 as a fourth subset of FPOEs. The first-fourth subsets of FPOEs are presented by classifier circuits 104 to FPOE subset select circuit 100 at about the same time. It is noted that auto spreader 80 may be implemented with fewer than four FPOE classifier circuits or more than four FPOE classifier circuits.

When FPOE subset selector circuit 100 receives one or more subsets of FPOEs from the classifier circuits 104, FPOE subset select circuit selects a subset of FPOEs that correspond to the lowest OBS values. FPOE subset select circuit 100 subsequently transmits the FPOEs of the selected subset to a randomizer circuit 102, which randomly selects one of the FPOEs it receives if there are more than one in the selected subset. The randomly selected FPOE is subsequently provided to the forwarding engine 52, which in turn inserts the randomly selected FPOE into a fabric header of a frame.

Figure 7:
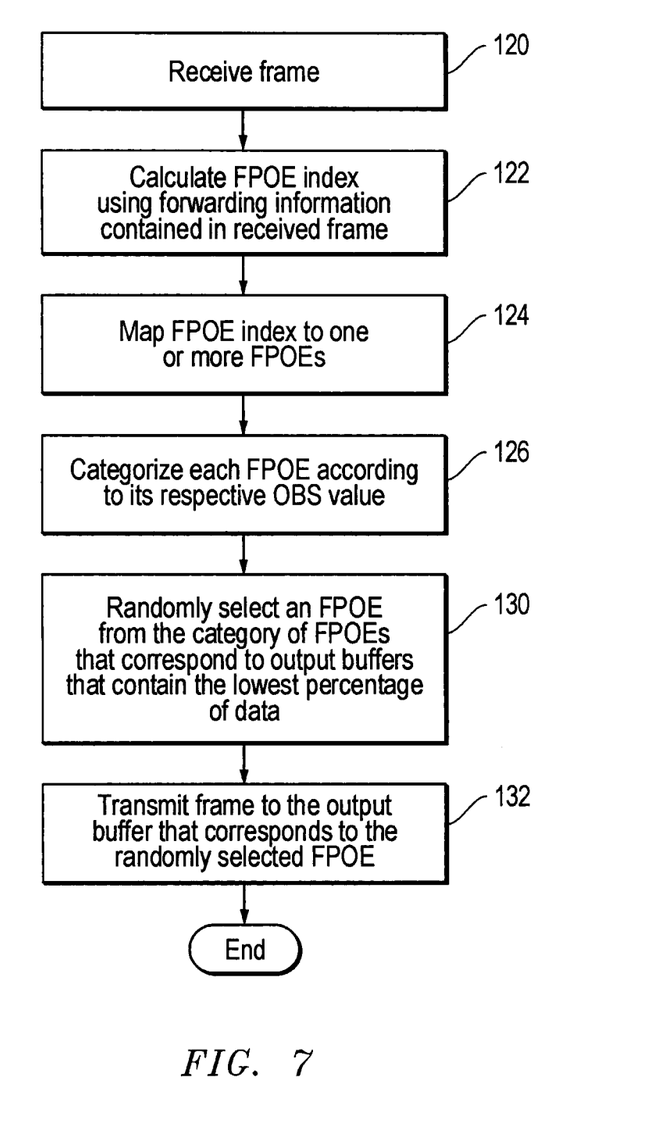
FIG. 7 is a simplified flow chart illustrating relevant aspects of selecting a fabric port of exit.

FIG. 7 illustrates relevant aspects of a process that can be implemented within, for example, the line card 42 shown in FIG. 5. In act 120, a frame is received by, for example, port processor 50(1). In response an FPOE index is generated using forwarding information contained in the frame that was received in step 120. A database such as FPOE database 54 can be accessed using the FPOE index generated in step 122, and in response, the database provides one or more FPOEs that are mapped to the FPOE index as shown in step 124. Each of these one or more FPOEs are categorized by, for example, FPOE classifier circuits 104 into one or more subsets according to the most recently calculated OBS values that correspond to the one or more FPOEs. Thereafter, as shown in step 130, a device such as randomizer 102 randomly selects an FPOE from the subset of FPOEs that are mapped to the lowest OBS values. In step 132, the randomly selected FPOE is added to a fabric header that is attached to the frame that was received in step 120. Thereafter, the frame is transmitted to an output buffer of a switching fabric that corresponds to the randomly selected FPOE.

Using the OBS values, auto spreader 80 of FIG. 6 provides self-adjustment through feedback. If there are N output buffers 72 with the lowest OBS values and randomizer 102 favors some of them, they will receive more frames than their peers and may begin to fill. As a result they will fall out of the lowest OBS subset and frame traffic is distributed to the remaining output buffers 72. Feedback of output buffer fullness corrects any unfairness caused by a fast but imperfect randomizer, such as randomizer 56 shown in FIG. 4. Thus, by using OBS values, auto spreader 80 will balance frame traffic among the output buffers 72. If information regarding internal pathways through the crossbar 74 to the output buffers is also used in creating subsets that are provided to randomizer 102, then randomizer 102 could select an FPOE based on output buffer fullness and/or latency.

The foregoing was described with reference to switching devices. The term switching device should be understood in its broadest sense, and can be defined to encompass bridges, routers, etc. Thus, the invention as claimed could be implemented in a router element such as the router element 400 shown in FIG. 8. In this depiction, router element 400 includes a number of line cards (line cards 402(1)-(N)) that are communicatively coupled to a forwarding engine 410 and a processor 420 via a data bus 430 and a result bus 440. Line cards 402(1)-(N) include a number of port processors 450(1,1)-(N,N) which are controlled by port processor controllers 460(1)-(N). It will also be noted that forwarding engine 410 and processor 420 are not only coupled to one another via data bus 430 and result bus 440, but are also communicatively coupled to one another by a communications link 1070.

Figure 8:
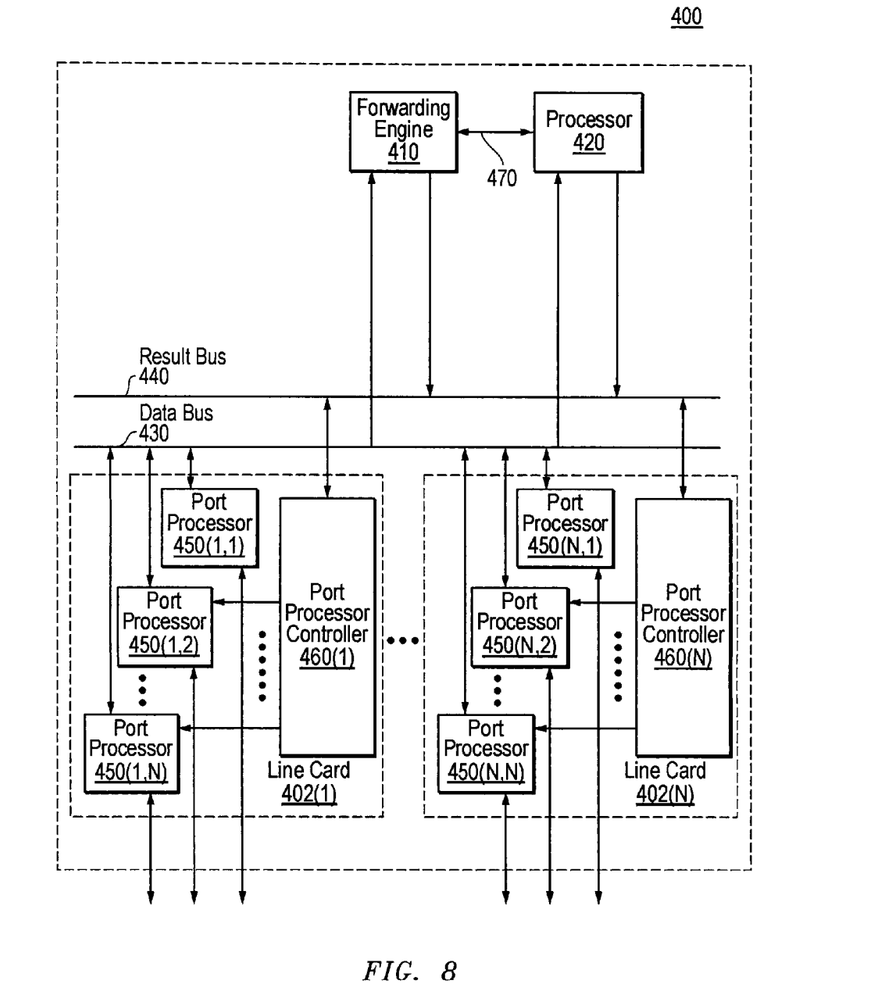
FIG. 8 is a simplified block diagram of a router element.

When a frame is received, the frame can be identified and analyzed by a router element such as router element 400 in the following manner. Upon receipt, a frame (or some or all of its control information) is sent from the one of port processors 450(1,1)-(N,N) at which the frame was received to one or more of those devices coupled to data bus 430 (e.g., others of port processors 450(1,1)-(N,N), forwarding engine 410 and/or processor 420). Handling of the frame can be determined, for example, by forwarding engine 410. For example, forwarding engine 410 may determine that the frame should be forwarded to one or more of port processors 450(1,1)-(N,N). This can be accomplished by indicating to corresponding one(s) of port processor controllers 460(1)-(N) that the copy of the frame held in the given one(s) of port processors 450(1,1)-(N,N) should be forwarded to the appropriate one of port processors 450(1,1)-(N,N).

In the foregoing process, network security information can be included in a frame sourced by routing element 400 in a number of ways. For example, forwarding engine 410 can be used to detect the need for the inclusion of network security information in the packet, and processor 420 can be called into service to provide the requisite network security information. This network security information can be included in the frame during the transfer of the frame's contents from one of port processors 450(1,1)-(N,N) to another of port processors 450(1,1)-(N,N), by processor 420 providing the requisite information directly, or via forwarding engine 410, for example. The assembled frame at the receiving one of port processors 450(1,1)-(N,N) can thus be made to contain the requisite network security information.

In addition, or alternatively, once a frame has been identified for processing according to the present invention, forwarding engine 410, processor 420 or the like can be used to process the frame in some manner or add frame security information, in order to secure the frame. On a node sourcing such a frame, this processing can include, for example, encryption of some or all of the frame's information, the addition of a digital signature or some other information or processing capable of securing the frame. On a node receiving such a processed frame, the corresponding process is performed to recover or validate the frame's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a plurality of first values, wherein each of the first values is related to a quantity of data stored in a respective one of a plurality of buffers, wherein one of the plurality of first values is numerically greater than another of the plurality of first values, which in turn is numerically greater than yet another of the plurality of first values;
   receiving first identifiers, wherein the first identifiers correspond to buffers, respectively, of a first subset of the plurality of buffers, wherein the first identifiers include some but not all of a plurality of identifiers corresponding to the plurality of buffers, respectively, wherein each of the buffers corresponding to the first identifiers is coupled to a same destination device for the first frame so that the first frame can be transmitted to the destination device via any of the buffers corresponding to the first identifiers;
   selecting a subset of the first identifiers based on one or more of the first values;
   selecting one of the first identifiers contained in the selected subset;
   transmitting a first frame to the buffer that corresponds to the selected one of the first identifiers.

2. The method of claim 1 wherein the first identifiers comprise fabric port of exits (FPOEs) of a switching fabric.

3. The method of claim 2 further comprising an act of inserting the selected one of the FPOEs into a header contained in the first frame or attached to the first frame.

4. The method of claim 1 further comprising:
receiving a second frame;
receiving second identifiers, each of which corresponds to a respective one of a second subset of the plurality of buffers;
selecting a subset of the second identifiers based on one or more of the first values;
selecting one of the second identifiers contained in the selected subset of the second identifiers;
transmitting the second frame to the buffer that corresponds to the selected one of the second identifiers.

5. The method of claim 1 wherein the plurality of buffers are contained in a switching fabric.

6. The method of claim 1 further comprising an act of classifying each of the first identifiers into two or more subsets, wherein the subset is one of the two or more subsets.

7. The method of claim 1 wherein selecting one of the first identifiers comprises randomly selecting one of the first identifiers.

8. The method of claim 1 further comprising:
calculating a first index based on first forwarding information that is contained in the first frame;
mapping the first index to the first identifiers;
receiving a second frame;
calculating a second index based on second forwarding information that is contained in the second frame;
mapping the second index to second identifiers.

9. A network device comprising:
a first circuit for receiving a plurality of first values and first identifiers, wherein each of the first values is related to a quantity of data stored in a respective one of a plurality of buffers, wherein the first identifiers correspond to buffers, respectively, of a first subset of the plurality of buffers, wherein the first identifiers include some but not all of a plurality of identifiers corresponding to the plurality of buffers, respectively, wherein one of the plurality of first values is numerically greater than another of the plurality of first values, which in turn is numerically greater than yet another of the plurality of first values wherein each of the buffers corresponding to the first identifiers can be coupled to a same destination device for the first frame so that the first frame can be transmitted to the destination device via any of the buffers corresponding to the first identifiers;
a second circuit for selecting a subset of the first identifiers based on one or more of the first values;
a third circuit for selecting one of the first identifiers contained in the selected subset;
a fourth circuit for transmitting a first frame to the buffer that corresponds to the selected one of the first identifiers.

10. The network device method of claim 9 wherein the first identifiers comprise fabric port of exits (FPOEs) of a switching fabric.

11. The network device method of claim 10 further comprising a fifth circuit for inserting the selected one of the FPOEs into a header contained in the first frame or attached to the first frame.

12. The network device method of claim 9 wherein the plurality of buffers are contained in a switching fabric.

13. The network device method of claim 9 further comprising:
a fifth circuit for calculating a first index based on first forwarding information that is contained in the first frame;
a sixth circuit for mapping the first index to the first identifiers.

* * * * *

UNITED STATES PATENT AND TRADEMARK OFFICE
CERTIFICATE OF CORRECTION

| | |
|---|---|
| PATENT NO. | : 8,625,624 B1 |
| APPLICATION NO. | : 12/138569 |
| DATED | : January 7, 2014 |
| INVENTOR(S) | : Kenneth M. Rose et al. |

It is certified that error appears in the above-identified patent and that said Letters Patent is hereby corrected as shown below:

In the claims

Column 8
Line 56, in Claim 1, replace: "the first frame" by -- a first frame --
Line 64, in Claim 1, replace: "a first frame" by -- the first frame --

Column 10
Line 9, in Claim 9, replace: "the first frame" by -- a first frame --
Line 16, in Claim 9, replace: "a first frame" by -- the first frame --
Line 20, in Claim 10, delete: "method"
Line 23, in Claim 11, delete: "method"
Line 27, in Claim 12, delete: "method"
Line 29, in Claim 13, delete: "method"

Signed and Sealed this
Tenth Day of May, 2016

Michelle K. Lee
*Director of the United States Patent and Trademark Office*